Patented Aug. 21, 1951

2,564,710

UNITED STATES PATENT OFFICE 2,564,710

ELECTRICALLY CONDUCTING COATING ON GLASS AND OTHER CERAMIC BODIES

John M. Mochel, Louisville, Ky., assignor to Corning Glass Works, Corning, N. Y., a corporation of New York No Drawing. Application May 7, 1951,
Serial No. 225,056

1 Claim. (Cl. 201—73)

This application, which is a continuation-in-part of my pending application Serial Number 771,859, filed September 3, 1947, relates to electric resistance devices and is particularly directed to such a device comprising a glass or other non-porous vitreous ceramic surface provided with an electrically conducting iridized metal oxide film.

Electrically conducting metal oxide films produced by iridization of glass or other vitreous ceramic surfaces have recently been found useful as the resistance elements in electric resistance devices variously adapted for heating and other purposes.

Among the metal oxides which have been proposed for such application is tin oxide, the iridized films of which possess sufficiently low resistances to make their use as electric resistance elements especially attractive. Such films are, however, subject to easy "poisoning" in that the presence of a small amount of another metal oxide such as cadmium oxide, chromium oxide, copper oxide, iron oxide, zinc oxide, and the like effects such an increase in resistance that the films may be rendered practically useless for heating purposes. Presumably, with the exception of CdO, which has a lower resistance, this effect is due to the higher resistance exhibited by each of such other oxides in its corresponding iridized form. The effect of CdO in so raising the resistance of tin oxide films cannot be explained.

As disclosed in my pending application Serial Number 771,860, filed September 3, 1947, iridized films of indium oxide are also electrically conducting and are useful as electric resistance elements. Such a film, however, has a considerably higher resistance than an iridized tin oxide film of corresponding thickness.

I have now discovered that, despite such higher resistance, indium oxide can be combined with cadmium oxide in iridized form to produce films having resistances not only lower than those of corresponding indium oxide films but unexpectedly also lower than those of corresponding cadmium oxide films. Such lower resistance films, which find particular application as the resistance elements in electric heating devices and the like, comprise primarily cadmium oxide and indium oxide equivalent to approximately 0.1% to 25% $In_2O_3$.

The present films can be produced in the same manner as corresponding films of indium oxide or cadmium oxide alone. The glass or other vitreous ceramic surface to be iridized is heated to an elevated temperature of on the order of about 650° C. and preferably about 700° C.; and a solution containing a compound of cadmium and a compound of indium in proportions on the oxide basis to provide a film having the desired resistance is directed against such heated surface, advantageously in atomized form, for a time sufficient to produce a film of the requisite thickness. Under the high temperature conditions prevailing, the cadmium and indium salts apparently hydrolyze or otherwise decompose instantly and are converted to the corresponding oxides, which are deposited on the glass surface and integrally unite therewith. Contact of the iridizing medium with the heated surface for a period of up to a minute or so is generally sufficient, a 10 to 20 second treatment ordinarily producing a film of the first order of thickness.

(The thickness of such a film may be gauged by the apparent color caused by the interference of light waves reflected therefrom. As the thickness of the film increases, its apparent color changes, and the order or succession of the colors with increasing thickness corresponds to that of the well-known Newton rings described at page 147 in "A Treatise on Light," by R. A. Houstoun (Longmans Green & Co. Ltd. (1938)). The respective color sequence for each order and the thickness in Angstroms, based on red because it distinguishes the successive orders, are as follows:

| Order | Color Sequence | Thickness in Angstroms |
|---|---|---|
| 1st | white, yellow, red | 775 |
| 2nd | violet, blue, green, yellow, red | 2,320 |
| 3rd | purple, blue, green, yellow, red | 3,870 |
| 4th | green, red | 5,420 |
| 5th | greenish-blue, red | 6,970 |
| 6th | greenish-blue, pale red | 8,520 |
| 7th | greenish-blue, reddish-white | 10,070 |

Although other soluble compounds of cadmium or indium may be used, the nitrate of cadmium and the chloride of indium are preferred on account of their availability.

The resulting iridized glass or other ceramic surface is then provided with spaced terminals or electrodes for passage of an electric current through the film as by depositing a conventional silver metallizing paste along two opposite edges of the film and firing the same. Other means for introduction of the electric current into the film may of course be utilized for adaptation of the iridized surface as the resistance element in an electric resistance device.

The following examples are illustrative of the lowered resistances characteristic of the present films:

Examples

Solutions consisting of various proportions of $Cd(NO_3)_2 \cdot 4H_2O$ and $InCl_3$ dissolved in water were atomized against plates of a heat-resisting borosilicate glass maintained at 700° C. for a time adequate to produce films of the first order of thickness. By extrapolation the measured resistances of such films were converted to the respective resistances of the corresponding fourth order films. The oxide compositions of the respective solutions and the extrapolated resistances of the corresponding fourth order films are set forth below:

| Example | Per Cent CdO | Per Cent $In_2O_3$ | Ohms per square |
|---|---|---|---|
| 1 | 98.6 | 1.4 | 93 |
| 2 | 97.1 | 2.9 | 23 |
| 3 | 94.6 | 5.4 | 6 |
| 4 | 89.3 | 10.7 | 5 |
| 5 | 85.8 | 14.2 | 9 |
| 6 | 81.5 | 18.5 | 10 |
| 7 | 78.6 | 21.4 | 23 |
| 8 | 76.8 | 23.2 | 31 |
| 9 | 74.9 | 25.1 | 170 |

By way of contrast, an iridized cadmium oxide film of the fourth order of thickness has a resistance of about 95 ohms per square, and an iridized indium oxide film of the same thickness has a resistance of about 500 ohms per square.

(The electrical resistance of an iridized film is conveniently expressed in "ohms per square" for a stated thickness, the resistance of a square film being independent of the size of the square. The resistance, as will be understood, varies inversely with the thickness of the film.)

I claim:

An electric resistance device comprising a nonporous vitreous ceramic body having on a surface thereof an electrically conducing iridized metal oxide film integrally united with the surface and comprising primarily an oxide of cadmium and an oxide of indium equivalent to approximately 0.1% to 25% $In_2O_3$, said body being provided with spaced terminals in electrical contact with such film.

JOHN M. MOCHEL.

No references cited.